INVENTOR:
ANDREW J. PLATTNER
BY
Donnelly, Mentag & Harrington
ATTORNEYS

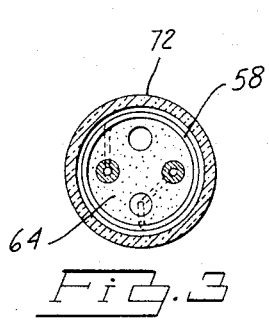
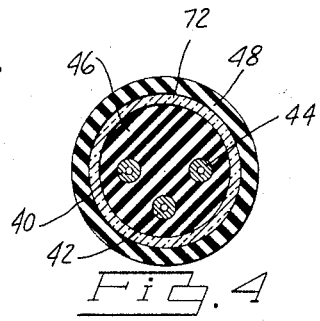
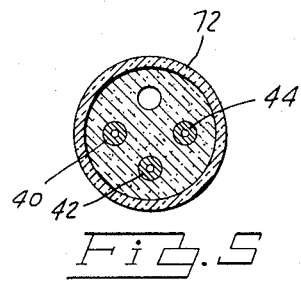
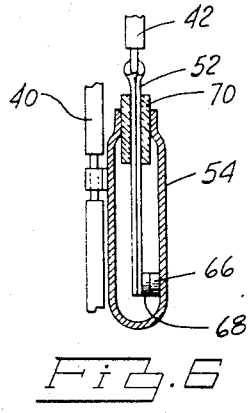
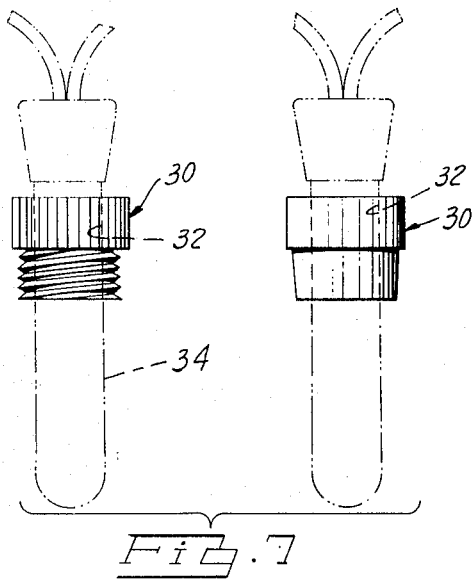
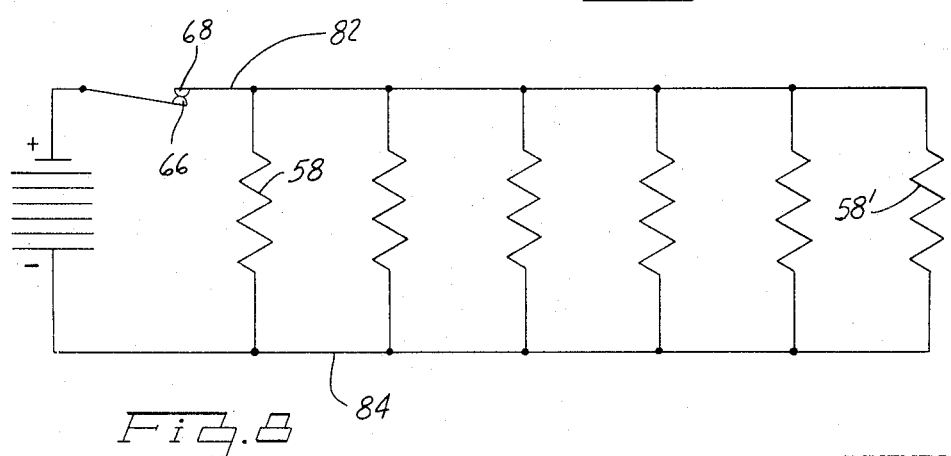

United States Patent Office 3,440,109
Patented Apr. 22, 1969

3,440,109
STORAGE BATTERY WITH THERMOSTATICALLY
CONTROLLED ELECTRIC HEATERS
Andrew J. Plattner, 13001 Puritan,
Detroit, Mich. 48227
Filed Nov. 22, 1966, Ser. No. 596,244
Int. Cl. H05b 1/02, 3/06
U.S. Cl. 136—161    4 Claims

ABSTRACT OF THE DISCLOSURE

An electrolytic storage battery having a housing and liquid electrolyte situated in said housing, and a plurality of electric heaters adapted to be mounted in said housing. Each of the electric heaters comprising an acid resistant casing extending within the housing, a portion of each casing being immersed in the electrolyte, an electric heating element situated in each casing at a location therein below the level of said electrolyte, granular electrically insulating and partially thermal conductive material surrounding said heating element, electric leads extending through said casing through one end thereof, means for sealing said one end of each casing, and means for connecting electrically heating elements in a parallel circuit, one side of each circuit being connected to a separate one of said terminals of said battery. One of the electric heaters comprises a thermostatic switch means connected to and forming a part of one of the electric leads for opening the circuit of its associated heating element upon an increase in the temperature of the electrolyte above a calibrated value.

SUMMARY OF THE INVENTION

My invention relates generally to self-heating, electrolytic, storage batteries, and more particularly to electric heaters for batteries such as lead-acid storage batteries used in automotive vehicles for energizing the electrical ignition system of the engine and the electrical accessories for the vehicle. It comprises a parasitic-type battery warmer that is capable of maintaining a desired temperature range for the electrolyte. It thereby prevents the battery from losing its electrical efficiency.

Upon a decrease in the temperature of the electrolyte, the operating efficiency of the battery for an internal combustion engine in an automotive vehicle decreases. This may result in inadequate power to crank the engine during starting of the engine. The improvement of my invention avoids extremely low temperatures in storage batteries of this type, and thereby provides more reliable cold weather operation and avoids freezing of the battery liquid. It does this by utilizing parasitic electrical energy of the battery itself to energize heaters that are immersed in the liquid and inserted through the usual access opening in the top of the battery casing. The heaters include a thermostatically controlled circuit and simple, compact, removable heater elements.

As the temperature of the battery decreases, the electrical charge that can be imparted to the battery decreases. More time and expense then is required in fleet-truck operations, for example, to maintain the trucks in operating condition in cold weather than if the temperature of the battery were maintained at the desired level. If the optimum electrolyte temperature range is maintained, the increased efficiency of the battery due to the temperature control of the electrolyte will make it possible to reduce the number of times the battery must be charged during any given period. This, of course, results in increased life of the battery which, in turn, results in further improvements in operating economy.

It has been found that during the cranking of a combustion engine, the heavy battery currents that are required result in the formation of lead sulfate crystals on the storage battery plates. If the sulfate crystals are allowed to age in the sulphuric acid, it becomes more difficult to convert them back into active ions. Thus, if the electrical generator or alternator for the engine is capable immediately of recharging the battery after the engine fires following the cranking period, the crystals are immediately subjected to the restoration process.

During continuous, cold weather operation of a vehicle, the engine generator may not be capable of supplying a continuous charge to the battery because of the inability of the battery to accept it due to low temperatures. The improved warmer of my invention, however, will overcome this difficulty by maintaining the electrolyte at a proper temperature which will permit the charge of the generator to be accepted by the battery.

According to a principal feature of my invention, the battery warmer is comprised of a compact circuit arrangement with individual heaters that are capable of being inserted within a battery cap commonly found in storage batteries of the type used in automotive vehicles. The individual heaters are connected electrically in a wiring circuit that is situated between the positive and negative terminals of the battery. The heaters themselves are immersed in the electrolyte, and one of the heaters contains a thermostatic switch element that responds to the temperature of the electrolyte to open and close the wiring circuit. The switch responds to changes in temperature to open the circuit when the temperature of the electrolyte reaches an upper limiting value. Parasitic power is drawn from the battery only when the temperature of the electrolyte falls below a lower temperature limit that is pre-established.

The provision of a battery warmer of the type above set forth being a principal object of my invention, it is a further object of my invention to provide a battery warmer that can be inserted and removed from the battery by a simple, manual adjustment with no special skills or tools being required.

It is a further object of my invention to provide a battery warmer of the type above set forth which is capable of withstanding the corrosive effects of the electrolyte within the battery.

DESCRIPTION OF THE FIGURES OF
THE DRAWINGS

FIG. 3 is a cross sectional view, taken along the plane of section line 3—3 of FIG. 2.

FIG. 4 is a cross sectional view, taken along the plane of section line 4—4 of FIG. 2.

FIG. 5 is a cross sectional view, taken along the plane of section line 5—5 of FIG. 2.

FIG. 6 is a cross sectional view of a thermostatic switch used in one of the heater elements shown in FIG. 2.

FIG. 7 shows alternate forms of battery caps through which the heater elements are adapted to be inserted.

FIG. 8 shows a schematic wiring diagram for my improved heater elements.

PARTICULAR DESCRIPTION

Figures 1, 2:
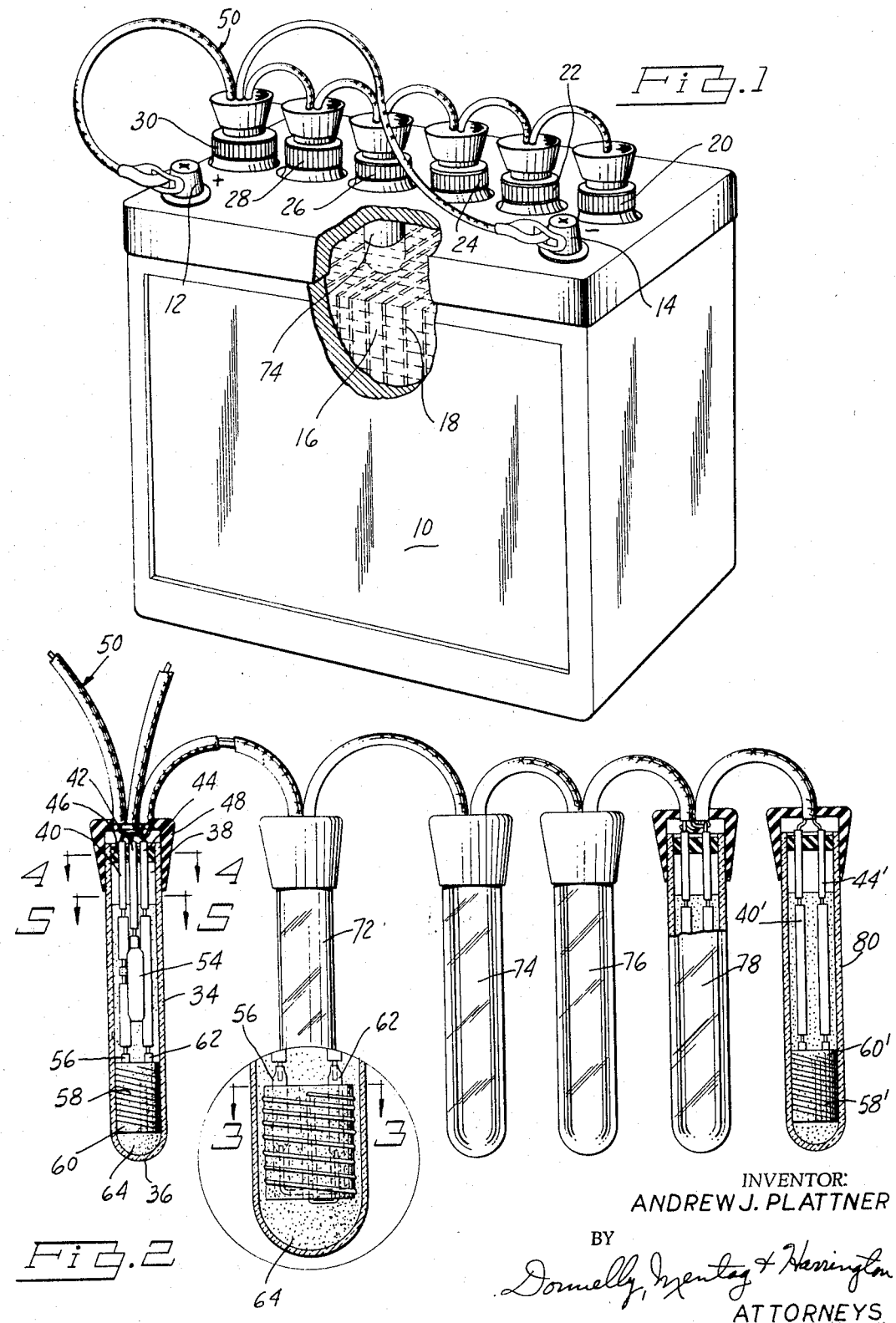
FIG. 1 shows in isometric form, partly in section, a battery with which my heater can be installed.
FIG. 2 shows, in partial cross sectional form, a series of heater elements arranged for insertion in the battery caps for the battery of FIG. 1.

In FIG. 1, numeral 10 designates generally a casing of a lead-acid, electrolytic, storage type battery. The battery terminals are shown at 12 and 14. The electrolyte is contained within the casing 10 as shown at 16. Immersed in the electrolyte is a series of lead plates 18 which react chemically with the electrolyte. Usually the electrolyte is sulphuric acid.

The casing can be divided into six cells, each of which has an access opening that is closed by a battery cap. These caps are identified by reference characters 20, 22, 24, 26, 28 and 30. Each cap is formed with a central opening, as indicated in FIG. 7, where the cap 30 is shown in detail. The cap 30 is formed with a central opening 32, through which a glass tube casing 34 is received.

The battery warmer casing 34 is fitted within the opening 32 with a tight fit. When the cap 30 is screwed in place, the casing 34 will be immersed below the surface of the electrolyte, as indicated in FIG. 1. The depth of the battery heater can be adjusted as desired to prevent contact with the plates 18. In the right hand view of FIG. 7, an alternate form of cap is shown at 32'. The use of this cap rather than the other is a matter of choice. But regardless of whether cap 32 or 32' is used, the casing of the heater can be inserted through it and the depth of the casing within the electrolyte can be controlled simply by sliding the casing through the cap opening.

The casing 34 of the heater may be formed of Pyrex glass to resist the corrosive effects of the electrolyte. It is closed at its lower end 36. Its upper end is sealed. The upper end of the casing 34 receives a ceramic sealer 38. Openings are formed in the sealer to admit the electrical leads 40, 42 and 44. These leads extend through a rubber seal 46. Covering the end of the casing 34 is a rubber protector cap 48.

The leads 42 and 44 are connected to an electrical wiring harness 50 which forms a circuit that will be described with reference to FIG. 8.

Lead 42 is connected to one terminal 52 of a thermostat switch element, as shown in FIG. 6. Lead 40 is connected to the casing 54 of the thermostatic element. Lead 40 is connected also to one end 56 of the heater element 58, which is in the form of an electrically heated wire wound around a ceramic insulator 60. The other end of the wire heater element is connected to end 62, which in turn is connected to lead 44. The ceramic 60, the heater element 58, the leads and the thermostat element are immersed in a magnesium oxide powder 64 which serves as an insulator and which avoids sudden changes in temperature within the casing 34. The ceramic 60 can be formed with longitudinal bores to permit entry of the coil ends 56 and 62, as indicated best in the cross sectional view of FIG. 3.

The casing 54 surrounds the terminal 52. It carries a contact point 66, which is adapted to engage the contact point 68 carried on the end of the terminal 52. The casing 54 thus acts as a conductor. The casing 54 is separated from the terminal 52 by an insulator 70. The lead 40, which is connected to the casing 54, is connected to contact point 66 through the casing.

The terminal 52 is comprised in part by a bi-metallic strip which is adapted to move away from contact 66 when it is heated and to move toward contact 66 when it is cold, thus opening and closing the circuit for the heating element 58 in response to temperature changes.

The other heaters are identified in FIG. 2 by reference characters 72, 74, 76, 78 and 80. Each of these can be substantially identical in form. For this reason, only one of them has been shown in cross section in FIG. 2. Heater 80 includes a ceramic insulator 60' and a heating coil 58', which correspond to the heating coil and ceramic insulator of the heater described previously. Heater 80 includes electrical leads 40' and 44' corresponding to the leads 40 and 44 described previously.

The leads for each of the heaters are connected in parallel with respect to each other. The wiring diagram for the wiring harness is shown in FIG. 8 where the individual heating coils are connected on opposite sides of main leads 82 and 84 of the wiring harness. The electrical contacts of the thermostatic switch open and close the parallel circuit of FIG. 8. One side of the circuit is connected to the positive terminal of the battery and the other side is connected to the negative terminal. Thus, when the thermostatic switch opens, all of the heating coils are de-energized.

Having described a preferred form of my invention, what I now claim and desire to secure by U.S. Letters Patent is:

1. In an electrolytic storage battery having a housing and liquid electrolyte situated in said housing, a plurality of electric heaters adapted to be mounted in said housing, each heater comprising an acid resistant casing extending within said housing, a portion of each casing being immersed in said electrolyte, an electric heating element situated in each casing at a location therein below the level of said electrolyte, granular electrically insulating and partially thermal conductive material surrounding said heating element, electric leads extending through said casing through one end thereof, means for sealing said one end of each casing, and means for connecting electrically said heating elements in a parallel circuit, one side of each circuit being connected to a separate one of the terminals of said battery, one of said electric heaters comprising a thermostatic switch means connected to and forming a part of one of said leads for opening the circuit of its associated heating element upon an increase in the temperature of said electrolyte above a calibrated value.

2. The combination set forth in claim 1 wherein: said battery comprises a plurality of battery cells, an access opening in each compartment above the level of the electrolyte therein, and a battery cap fitted in each opening, each cap being apertured, one heating element being received through each battery cap aperture, said heaters being held by said caps when they are in position.

3. The combination set forth in claim 1 wherein: said battery comprises a plurality of battery cells, an access opening in each cell above the level of the electrolyte therein, and a battery cap fitted in each opening, each cap being apertured, one heating element being received through each battery cap aperture, said heaters being held by said caps when they are in position, said switch means being located in the casing of one heater and surrounded by said thermal conductive material.

4. The combination set forth in claim 1, wherein: said thermostatic switch means being situated in one side of said parallel circuit whereby it is adapted to open and close the circuit for the heating element of each of the heaters upon increase of the temperature of the electrolyte in said battery above a predetermined level.

References Cited

UNITED STATES PATENTS

| | | | |
|---|---|---|---|
| 2,516,048 | 7/1950 | Andress | 136—161 |
| 2,666,838 | 1/1954 | Krah et al. | 219—523 X |
| 2,674,643 | 4/1954 | Dahl et al. | 136—182 |
| 2,754,407 | 7/1956 | Smith | 219—523 |
| 2,789,201 | 4/1957 | Sherwin | 219—523 |
| 2,811,629 | 10/1957 | Danner | 219—523 |
| 3,012,088 | 12/1961 | Grady et al. | 136—161 |
| 3,107,290 | 10/1963 | Willinger | 219—523 X |
| 3,371,192 | 2/1968 | Rosenel | 219—523 |
| 3,375,319 | 3/1968 | Beck | 13—25 |

VOLODYMYR Y. MAYEWSKY, Primary Examiner.

U.S. Cl. X.R.

219—331, 523, 553